Sept. 27, 1966      C. JÜNGER      3,274,894

HYDRAULIC APPARATUS

Filed Jan. 24, 1962      2 Sheets-Sheet 1

*Inventor:*
CARL JÜNGER

BY Michael S. Striker
his ATTORNEY

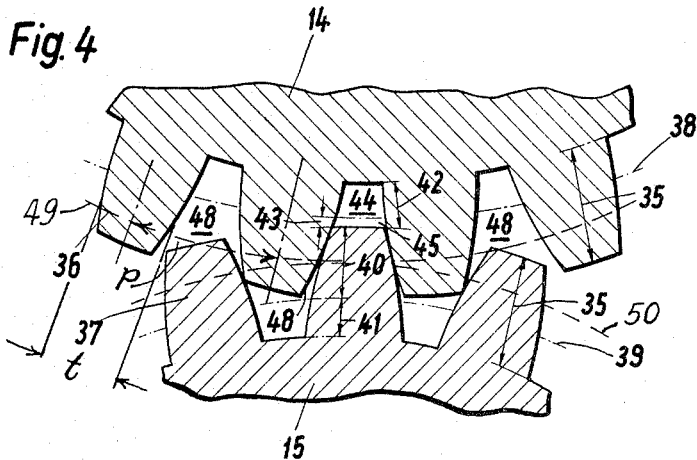
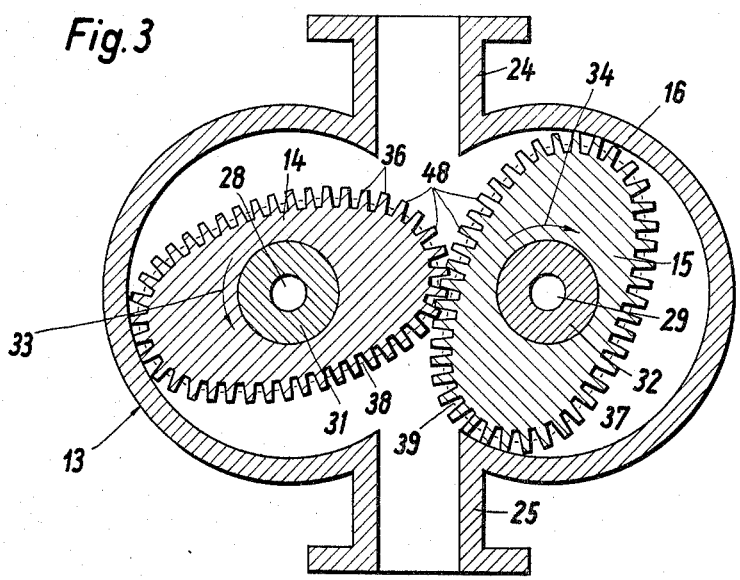

3,274,894
HYDRAULIC APPARATUS
Carl Jünger, Mannheim, Germany, assignor to Bopp & Reuther G.m.b.H., Mannheim-Waldhof, Germany
Filed Jan. 24, 1962, Ser. No. 168,455
1 Claim. (Cl. 91—87)

The present invention relates to hydraulic apparatus in general, and more particularly to an apparatus which is especially suited for measuring the volume or the rate of flow of a liquid substance. Still more particularly, the invention relates to improvements in toothed gears which are utilized in such apparatus.

An important object of my invention is to provide a hydraulic apparatus in which the fluid entrapped between the mating teeth of cooperating gears can escape more readily than in conventional apparatus of this general character.

Another object of the invention is to provide a novel type of gears for use in apparatus for measuring the volume or the rate of flow of a fluid substance.

A further object of the invention is to provide a hydraulic apparatus of the above outlined characteristics in which overloading of bearings is prevented in a very simple and efficient manner.

With the above objects in view, the invention resides in the provision of a hydraulic apparatus which comprises a casing having an internal chamber, a pair of spaced parallel internal surfaces in the chamber, spaced liquid admitting inlet means and liquid evacuating outlet means which communicate with the chamber, and a pair of cooperating gears in the chamber. The novelty resides in special construction of the gear teeth in that the whole depth of the teeth is greater than the whole depth of conventional gear teeth so that the ratio of the volume of a recess provided between two adjacent teeth of one of the gears to the volume of the fluid containing space in this recess upon maximum penetration of a tooth of the other gear therein is about 2.5:1 to 5:1.

In other words, the whole depth of the teeth is more than $0.6866 p$, wherein $p$ is the circular pitch of the gears. By expressing the novel construction of the gear teeth in a different way, it can be said that the clearance between the tip of a tooth on one of the gears and the root of the mating recess in the other gear is more than $0.05 p$ or more than $t/10$, wherein $p$ is the circular pitch of the gears and $t$ is the thickness of the tooth at the pitch line.

The novel features which are considered as characteristic of the invention are set forth in particular in the appended claim. The invention itself, however, both as to its construction and its method of operation, together with additional objects and advantages thereof, will be best understood from the following detailed description of a specific embodiment with reference to the accompanying drawings, in which:

FIG. 3 is an enlarged horizontal section through the casing of the hydraulic apparatus as seen in the direction of arrows from the line III—III of FIG. 1; and FIG. 4 is a greatly enlarged fragmentary detail view of the mating teeth forming part of the gears shown in FIG. 3.

Figure 1:
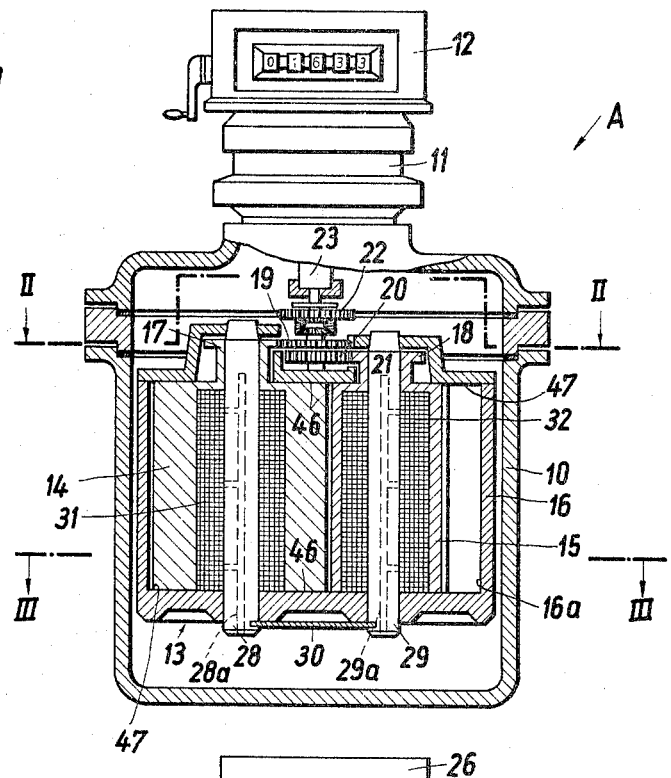
FIG. 1 is a partly elevational and partly sectional view of a fluid volume gauge or meter embodying a hydraulic apparatus whose cooperating fluid displacing rotatary gears are constructed in accordance with my invention.
Figure 2:
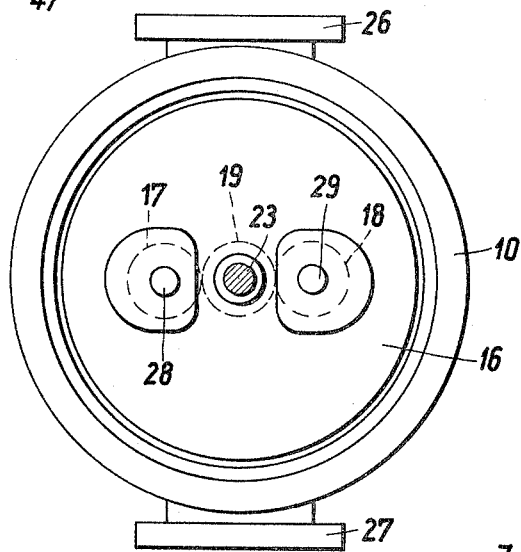
FIG. 2 is a horizontal section as seen in the direction of arrows from the line II—II of FIG. 1.

Referring now in greater detail to the illustrated embodiment, and first to FIGS. 1 and 2, there is shown a fluid volume meter or gauge A which comprises an outer housing 10 having a detachable extension 11 for the counter mechanism 12. This counter mechanism is operated by a pair of cooperating rotary members here shown in the form of meshing oval gears 14, 15 forming part of a hydraulic motor 13 which also comprises a casing 16 mounted within the housing 10 and defining an internal chamber 16a for the gears 14, 15. The upper ends of the gears 14, 15 are respectively provided with coaxial spur gears 17, 18 which mesh with gears 19, 20 provided on a shaft 21. The shaft 21 drives additional gears 22 and the input shaft 23 of the counter mechanism 12. The parts 17–23 together constitute a motion-transmitting or driving connection between the oval gears 14, 15 and the counter mechanism 12. The exact construction of this driving connection and of the counter mechanism forms no part of the present invention.

The pump casing 16 is provided with an inlet or suction nipple 24 and with a spaced outlet or discharge nipple 25, see FIG. 3. These nipples are respectively aligned with the nipples 26, 27 of the outer housing 10, and the nipples 26, 27 are connected in a conduit (not shown) for the fluid whose speed or rate of flow per unit of time requires determination.

The end walls of the pump casing 16 support two parallel shafts 28, 29 for the gears 14, 15, respectively. These shafts are rigidly mounted in the casing 16 and are held against rotation by a plate-like member 30. A cylindrical bearing sleeve 31 of carbon or another suitable material is press-fitted into the gear 14 and is rotatably mounted on the shaft 28. A similar sleeve 32 is press-fitted into the gear 15 and is rotatable about the shaft 29.

The fluid admitted through the nipples 26, 24 rotates the gears 14, 15 in directions respectively indicated in FIG. 3 by the arrows 33, 34 and is discharged through the nipples 27, 25. The gears 17, 18 then rotate the parts 19–23 and the counter mechanism 12 records the rate of fluid flow.

The shafts 28, 29 are respectively formed with lubricant conveying bores or channels 28a, 29a.

In accordance with the present invention, the whole depth 35 (FIG. 4) of the teeth 36, 37, on the oval gears 14, 15 is greater than the whole depth of teeth on conventional gears of which I am aware at this time. The phantom lines 38, 39 indicate the root circles of conventional gears which are respectively replaced by the gears 14, 15. The dotted lines 49 and 50 show respectively the pitch circles of gears 14 and 15 and FIG. 4 illustrates also the circular pitch $p$ and the tooth $t$ at the pitch line. Thus, the whole depth 35 of a tooth 36 or 37 equals the whole depth 40 of conventional teeth plus the distance 41 which latter is the difference between the distances 35, 40 and which may equal between 30–40 percent of the distance 40. In other words, the clearance 42 between the tip of a tooth 37 and the root of the mating space or recess 48 in the gear 14 is a multiple of the clearance 43 between the tip of the tooth and the root of the mating recess in conventional oval gears. Consequently, the volume of the space 44 enclosed by two adjacent teeth 36 of the gear 14 and the mating tooth 37 of the gear 15 is much greater than the volume of the space 45 between the phantom-line root circle 38 and the tip of the tooth 37. The space 44 accommodates the fluid medium entrapped between the teeth 36, 37 when the gears 14, 15 rotate. Experiments carried out with gears of the type shown in FIG. 4 have shown that the enlarged spaces 44 insure much better distribution of fluid pressures even though this is contrary to expectations since a purely theoretical consideration would lead an expert to different conclusions.

As is known, the fluid entrapped between the mating teeth of cooperating gears is expelled in the axial direction and toward the end faces of the gears. In the embodiment shown in FIGS. 1 to 4, the fluid entrapped in the spaces 44 is compelled to flow toward the end faces 46 of the gears 14, 15 and escapes through the small gaps provided between these end faces 46 and the internal end surfaces 47 of the casing 16 in the chamber 16a. A small gap between each end face of the gears 14, 15 and the adjacent internal surface of the casing 16 is necessary since the fluid entrapped in the spaces 44 must find a way to escape from these spaces when the volume of the spaces diminishes in response to rotation of the gears. On the other hand, when the volume of the spaces 44 begins to increase, the fluid must be permitted to enter in order to avoid subatmospheric pressures which would exert a braking action on the gears.

The oval gears 14, 15 of the instrument shown in FIGS. 1 to 4 are of considerable axial length (see FIG. 1) and, therefore, the volume of fluid expelled from a recess 48 between a pair of adjacent teeth 36 or 37 when the gears 14, 15 rotate is very large. As is known, the volume of fluid expelled from such recesses depends on the axial length of the teeth, on the number of teeth, on the pitch angle, on the pitch, and on the pitch ratio of intermeshing gears. However, this relationship is valid only for identical intermeshing gears.

FIG. 3 shows that the axial distance between the shafts 28, 29 is not greater than if these shafts would support gears with root circles 38, 39. In other words, the clearances 42 are increased by increasing the whole depth 35 of the teeth 36, 37 rather than by moving the shafts 28, 29 away from each other.

The fluid entrapped in the space 44 exerts a radial pressure against the gears 14, 15 by urging the gears against the shafts 28, 29. Such radial pressure brings about increased friction between the sleeves 31, 32 and the respective shafts 28, 29 which, in turn, reduces the pressure of fluid flowing through the casing 16. Another substantial reduction in fluid pressure is due to friction developing between the fluid flowing in the space 44 toward the end faces 46 and the flanks of cooperating teeth 36, 37. This friction is considerable, particularly in conventional gears, i.e., in gears whose mating teeth enclose a small space such as the space 45 shown in FIG. 4. By increasing the volume of this space, i.e., by increasing the whole depth of teeth 36 and 37, the fluid entrapped in the space 44 can flow more rapidly and with lesser friction toward the end faces 46 of the gears 14, 15. This is due to the fact that the fluid entrapped in the space 44 actually flows in two streams including a slower stream which forms a layer along the tooth flanks bounding the space 44 and a more rapid stream which is surrounded by and flows with respect to this layer. Thus, the evacuation of fluid from the recesses 48 between the adjacent teeth 36 or 37 during penetration of the mating teeth can take place more rapidly and with less friction which, of course, is of utmost importance in hydraulic apparatus of the type to which this invention pertains.

In order to make sure that, as a result of increased whole depth of the teeth 36, 37, the strength of these teeth is not reduced below a permissible minimum value, the root portions of the teeth may be of somewhat greater width which is sufficient to prevent breakage when the gears are in actual use.

As is known, the primary purpose of teeth on oval gears is to provide a satisfactory sealing action, i.e., to form a seal between the suction side and the pressure side of the hydraulic apparatus. These teeth can be compared with labyrinth seals. In many instances, the oval gears may be replaced by oval friction wheels whose peripheries are in tight frictional engagement with each other. The rotary movements of oval gears are brought about primarily by fluid pressure acting against the longer force arm of each oval gear, i.e., in directions perpendicular to the longer axes of such gears. In addition to the aforementioned sealing action, the teeth 36, 37 of the gears 14, 15 also insure that the two gears rotate in a predetermined rhythm, i.e., that there is no slippage. However, this can be achieved by other means, for example, by the gears 17, 18 which are shown in FIG. 1.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claim.

What is claimed as new and desired to be protected by Letters Patent is:

In a hydraulic apparatus, in combination, a pair of cooperating fluid displacing rotary gears having intermeshing teeth and recesses formed between the adjacent teeth thereof, the whole depth of said teeth being such that, during penetration of a tooth of one of said gears into the mating recess of the other gear, the minimum volume of the space formed between the root of the recess and the tip of the mating tooth is sufficient to permit the fluid contained in said space to form a first stream which is adjacent to the flanks of the teeth bounding said space and a more rapid second stream surrounded by said first stream, said streams flowing in the axial direction of said teeth.

References Cited by the Examiner

UNITED STATES PATENTS

| 1,085,290 | 1/1914 | Pagel | 103—126 |
| 1,252,160 | 1/1918 | Pagel | 103—126 |
| 1,460,875 | 7/1923 | White | 103—126 |
| 1,799,237 | 4/1931 | Jensen | 103—126 |
| 1,828,114 | 10/1931 | Hubbard | 74—462 |
| 1,863,160 | 6/1932 | Jensen | 103—126 |
| 2,368,019 | 1/1945 | Guibert et al. | 74—434 |
| 2,407,698 | 9/1946 | Guibert et al. | 121—70 |
| 2,601,004 | 6/1952 | Cintron | 103—126 |
| 2,714,856 | 8/1955 | Kane | 103—126 |
| 2,869,473 | 1/1959 | Kreamer | 103—126 |

FOREIGN PATENTS 309,685   4/1929   Great Britain.

OTHER REFERENCES

Marks: Mechanical Engineers Handbook, 1941, pp. 948, and 949, 4th ed., McGraw-Hill, New York.

MARK NEWMAN, *Primary Examiner.*

KARL J. ALBRECHT, JOSEPH H. BRANSON, JR., SAMUEL LEVINE, *Examiners.*

H. C. COE, F. T. SADLER, *Assistant Examiners.*